P. L. KLEIN.

Wool Carding Machine

No. 8,156. Reissued April 2, 1878.

Witnesses.

~~Otto Hufeland.~~

Hugo Bruggemann

Inventor.

Peter Ludwig Klein by

Van Santvoord & Hauff his attorneys.

N. PETERS, PHOTO-LITHOGRAPHER, WASHINGTON, D. C.

UNITED STATES PATENT OFFICE.

PETER LUDWIG KLEIN, OF WERDEN ON THE RUHR, PRUSSIA, GERMANY.

IMPROVEMENT IN WOOL-CARDING MACHINES.

Specification forming part of Letters Patent No. 185,332, dated December 12, 1876; Reissue No. 8,156, dated April 2, 1878; application filed November 30, 1877.

*To all whom it may concern:*

Be it known that I, PETER LUDWIG KLEIN, of Werden on the Ruhr, in the Kingdom of Prussia and Empire of Germany, have invented a new and useful Improvement in Machines for Carding Fibrous Materials, which improvement is fully set forth in the following specification, reference being had to the accompanying drawing, in which—

Figure 1:
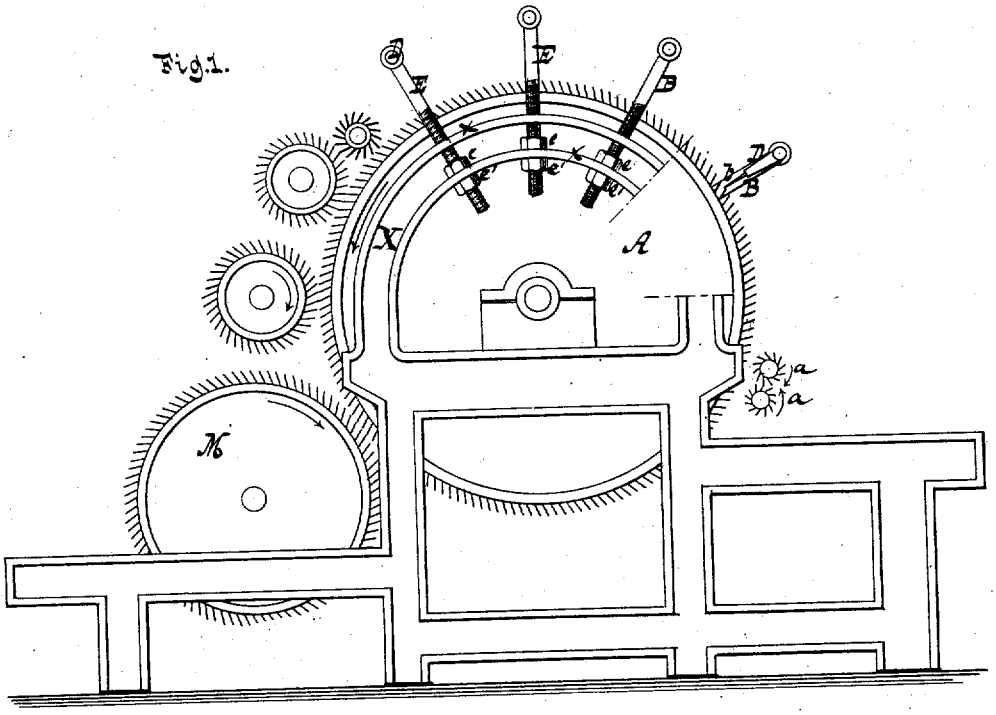
Figure 2:
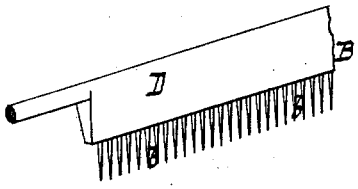

Figure 1 represents a side view, partly in section, of a carding-machine with my improvements attached. Fig. 2 is a perspective view of a portion of one of the combs.

Similar letters indicate corresponding parts.

This invention consists in the combination of a series of straight elastic stationary combs with the main cylinder of a carding-machine, said combs being arranged in parallel rows, extending over the entire length of said main cylinder, and pointing toward the center of the same, so that by the action of said combs the knots and flocks existing in the material to be carded are gradually opened, and the hairs or fibers are prevented from being torn into short lengths.

Heretofore, in the construction of carding-machines, single combs have been arranged with their teeth projecting between the teeth of the carding-cylinder, and a series of rigid-toothed combs, reciprocating radially with respect to the main cylinder, so as to free themselves from the wool, has also been used; but these devices have been inefficient in practice, for the reason that, in the first instance, the comb has but a brief action on the fiber, which is insufficient to straighten it, and in another example the rigid teeth break the fiber and release themselves from it only partially straightened.

By my improvement the defective operation of these devices is obviated, and, by a succession of yielding pressures upon the tangled portions of the wool, gradually lay the fibers approximately parallel with each other without breaking, and thus produce a roll from which a superior article of yarn may be spun.

In almost all fibrous materials adapted to be spun a great proportion of the fibers are free from knots, tufts, &c., and are nearly open, requiring only to be brought in the proper position to be fit for spinning. The remaining portion of wool consists of entangled knots, which have also caught parts of many of the already open hairs. Such mass of entangled hairs is known by the term of "wool tufts." These tufts are fed to the main cylinder in the position which they happen to occupy on the feed-table. The main cylinder catches them in all their irregular positions, and combs the same with great rapidity in and through the cards of the workers.

It is obvious that during this operation that portion of the wool which is most open passes deepest into the teeth of the main cylinder, while the entangled knots (which, however, contain many long open or stretched hairs) are situated nearest to the points of the teeth of the main cylinder, and are therefore driven down deepest into the teeth of the workers. By the hook-shaped form of its teeth the main cylinder retains that portion of the wool which, on its passage to the feed-rollers, has entered deepest between these teeth until it reaches the stripper, and in the same manner the tufts are retained by the workers and carried to the strippers. At the moment when the main cylinder forces the tufts situated nearest to the points of its teeth into the teeth of its workers all those hairs or fibers which in their entanglement form a connection between the whole mass of wool must either be torn at once out of that portion of the wool which is firmly retained in the teeth of the main cylinder or they must be forcibly torn asunder.

From these observations it will be seen that in carding-machines containing the ordinary workers and strippers a large quantity of the hairs are torn asunder, and consequently shortened. These disadvantages are overcome by my invention.

In the accompanying drawing, the letter A designates the main cylinder, turning in suitable bearings in the frame of the machine, in conjunction with the usual feed-rolls *a a* and the doffer M. With said main cylinder are combined a series of stationary combs, B, each of which is composed of a row of straight teeth, *b*, made of tempered steel. These combs point toward the center of the main cylinder, and they are arranged in rows parallel to each other, each row being secured to a box or head, D, the ends of which are secured in rods E, which are fastened in the flanges *x x* of the arched portion X of the frame of the machine, and are screw-threaded for the reception of nuts *e e'*, the nut *e'* being preferably on one side of the flange, and the nut *e* on the opposite side, so that each forms a species of jam-nut for the other.

It will be seen, then, that by manipulating these nuts the combs can be adjusted to different positions in respect to the main cylinder and secured after adjustment, as may be desirable.

In operating my machine, I adjust the combs so that their points are in close proximity to the carding-teeth of the main cylinder, without, however, coming in contact with the same. The most open parts of the wool fed to the main cylinder enter between the teeth of the main cylinder, while the entangled felt-like knots or tufts are retained on the points of the teeth of the main cylinder, and are carded and combed by the action of the combs as the main cylinder revolves, such combing and carding action being repeated by one row of combs after the other. On account of the great elasticity of the combs, and of their radial position toward the main cylinder, each single row of combs offers a comparatively slight resistance to the wool; and since said combs are readily thrown out of their radial position by the strain of the fibers, such fibers slide off readily, and the combs are thus kept clean during the carding operation. All the fibers which are stretched out by the combs place themselves between the carding-teeth of the main cylinder, and are not subjected to any further strain, being carried round until they reach the only remaining worker, which, however, is not expected to do any more carding, but simply to spread and equalize the wool fleece. A stripper takes the wool from the worker and returns it to the main cylinder. The fancy-roller raises the same to the points of the carding-teeth of the main cylinder, whence it is finally transferred to the doffer. From this doffer the wool is removed in the form of a fleece by a comb.

From these observations it will be readily seen that by the manner in which the carding operation is effected on my machine the fibers of the raw material are protected against undue strain, and they retain their original length much better than in the ordinary carding-machines, such action being due particularly to the successive action of the needles, each of which exerts a slight strain on the tufts retained in the teeth of the main cylinder without tearing the hairs, the needles being made elastic, so that they can give when the strain exceeds a certain limit, while, by the successive action of the several rows of needles, the hairs are gradually straightened out and delivered to the teeth of the main cylinder in the proper direction. In order to produce this action it is essential to place the needles so that they point toward the center of the main cylinder.

What I claim as new, and desire to secure by Letters Patent, is—

1. The combination, in a carding-machine, of a series of non-rotating combs, having pointed straight elastic teeth, with the main carding-cylinder, said combs extending across the entire length of said cylinder, and having their teeth pointing toward the center thereof, substantially as and for the purpose set forth.

2. The combination of the main carding-cylinder and the series of non-rotating, straight-toothed, radially-adjustable combs, substantially as described.

In testimony that I claim the foregoing I have hereunto set my hand and seal this 8th day of November, 1877.

PETER LUDWIG KLEIN. [L. S.]

Witnesses:

ROB. KAISER,

CARL BRANSCHEID.